United States Patent [19]

Brian

[11] E Re. 31,049

[45] Reissued Oct. 5, 1982

[54] FUEL-OPERATED DEVICE

[76] Inventor: William S. Brian, 25 Landing Rd., Huntington, N.Y. 11743

[21] Appl. No.: 246,654

[22] Filed: May 7, 1981

Related U.S. Patent Documents

Reissue of:

[64] Patent No.: 4,093,405
Issued: Jun. 6, 1978
Appl. No.: 764,751
Filed: Feb. 2, 1977

[51] Int. Cl.[3] ..... F04B 17/00; F04B 35/00

[52] U.S. Cl. ..... 417/343; 417/364; 417/380; 74/110; 123/197 AC

[58] Field of Search ..... 417/343, 364, 380, 339; 123/197 AB, 197 AC; 74/520, 521, 110

[56] References Cited

U.S. PATENT DOCUMENTS

| | | | |
|---|---|---|---|
| 797,417 | 8/1905 | Engelking | 417/343 |
| 2,610,785 | 9/1952 | Carlson | 417/343 |
| 2,742,606 | 4/1956 | Wann | 74/110 X |
| 3,291,431 | 12/1966 | Daniel | 74/521 X |
| 3,859,966 | 1/1975 | Braun | 123/46 |
| 4,140,440 | 2/1979 | Ferris | 417/364 |

*Primary Examiner*—Richard E. Gluck
*Attorney, Agent, or Firm*—Bauer & Amer

[57] ABSTRACT

Apparatus having fuel combustion cylinders for urging the rods of pistons operating therein through power strokes, and fluid pressure pistons, also operating in cooperating cylinders, which are correspondingly urged during said power strokes through movement causing the production of a pressure fluid which is thereafter utilized, on demand, to do work. In the transmission of said movement-producing forces of said fuel-powered apparatus input to said pressure fluid output, a linkage mechanism is advantageously utilized to provide a pressure pattern in the pressure fluid which starts at an optimum low value and progressively builds up. This effectively reverses the pressure pattern of the combustion fuel which consists of a rapid-expansion gas having an initial maximum value and, due to expansion, progressively diminishes in value. In this way, the operation of the within apparatus is characterized by such a high degree of efficiency that in place of gasoline it is feasible to use a non-fossil fuel, such as methanol or the like.

6 Claims, 2 Drawing Figures

FUEL-OPERATED DEVICE

Figure 1:
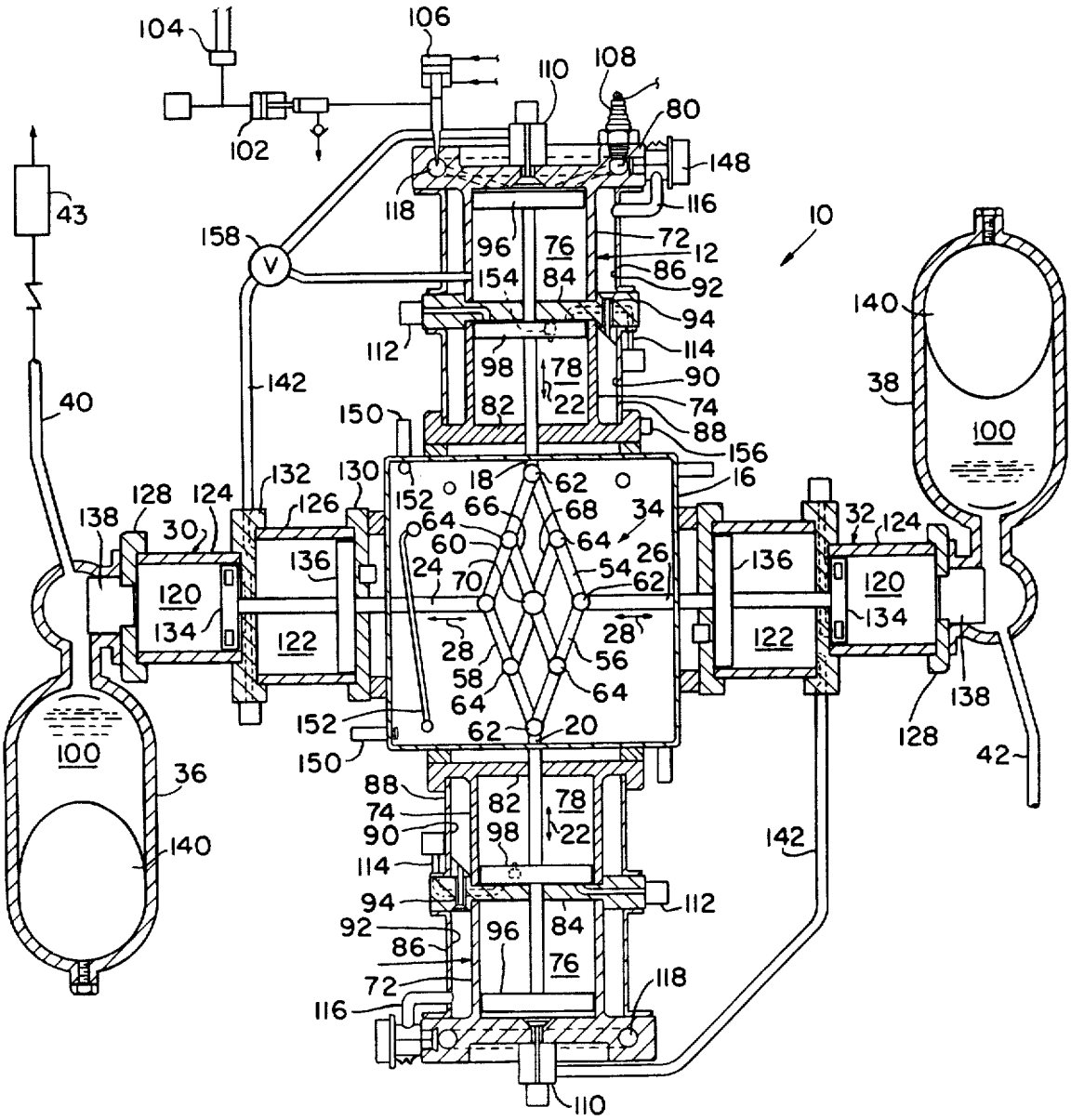

Matter enclosed in heavy brackets [ ] appears in the original patent but forms no part of this reissue specification; matter printed in italics indicates the additions made by reissue.

The present invention relates to an improved device for converting the energy available from fuel combustion into potential energy, in the form of pressurized fluid, and more particularly to an energy converter for which, due to its noteworthy level of efficiency, it is feasible to use a non-fossil fuel, such as methanol, thus achieving a significant advantage over a conventional gasoline-powered engine or device from an ecological point of view.

In numerous devices and equipment, pressurized fluid is the energy source used to operate a fluid motor and thus perform the power service that is required of these devices. That is, potential energy is stored in the fluid under pressure in an appropriate fluid container or accumulator, and the release of this fluid under properly supervised conditions is effectively used for selected mechanical functions, such as moving a vehicle, turning an electric generator, operating a pump, and the like. The referred to pressurized fluid is, in practice, produced or, more properly converted from energy made available from the combustion of a fuel; so also is it achieved according to the present invention, except that the conversion apparatus utilized herein is characterized by a high level of efficiency heretofore unknown in the prior art. To a significant extent, this characterizing degree of efficiency is attributable to the recognition which underlies the present invention that the pressure pattern of the typical combustion fuel does not contribute to efficient production of the pressure fluid, even if elaborate precautions are undertaken to avoid efficiency losses, and that therefore this pressure pattern must be appropriately modified. This is in contrast to prior art techniques which are mainly concerned with providing even more elaborate means to avoid efficiency losses in the operation of the energy converter, but do not propose any basic changes in the pressure patterns of the input and output energy forms, as hereinafter is subsequently explained in detail.

Broadly, it is an object of the present invention to provide a fuel-pressure fluid energy converter overcoming the foregoing and other shortcomings of the prior art. Specifically, it is an object to provide a device which, when applying the pressure pattern of the expanding gas of the combustion fuel to the powering fluid, is effective in reversing the same, such that the pressure build-up in said fluid starts at an optimum low point and progressively increases, thereby avoiding heat dissipation and thus a significant efficiency loss during said conversion.

A combustion fuel to pressurized fluid energy converter demonstrating objects and advantages of the present invention includes first and second combustion cylinders each having slidably disposed piston rods extending therefrom operatively arranged in opposing facing relation to each other such that said piston rods are urged through power strokes towards each other along a first movement path. Adapted to be delivered into these cylinders is a gas-producing type fuel which, when ignited, produces an initially maximum pressure expanding gas that is effective in powering said piston rods through said power strokes. Cooperating with the combustion cylinders are pressure transfer fluid cylinders each having slidably disposed piston rods extending therefrom operatively arranged in opposing facing relation to each other such that said piston rods are urged through fluid-compressing strokes away from each other along a second movement path oriented perpendicularly and in crossing relation to said first movement path. Completing the within device is a coupling linkage means strategically located at the intersection of said first and second movement paths operatively interconnected between said piston rods of said combustion and said cylinders so as to produce said fluid-compressing strokes in the latter in response to said power strokes of the former. Said coupling linkage means, more particularly, consists of pivotally interconnected links in a diamond-shaped configuration effective to initially cause an amplification of the movement occurring along said first movement path in said corresponding extent of movement occurring along said second movement path and subsequently a reversal, or diminishment, therein. Thus, despite an initial maximum pressure in said expanding gas of said fuel, there is nevertheless produced in said fluid a pressure at a desirable starting minimum value which subsequently builds up. This pressure pattern contributes to the efficiency of the conversion of said fuel energy into usable pressure fluid energy, all as is explained subsequently in detail.

Figure 2:
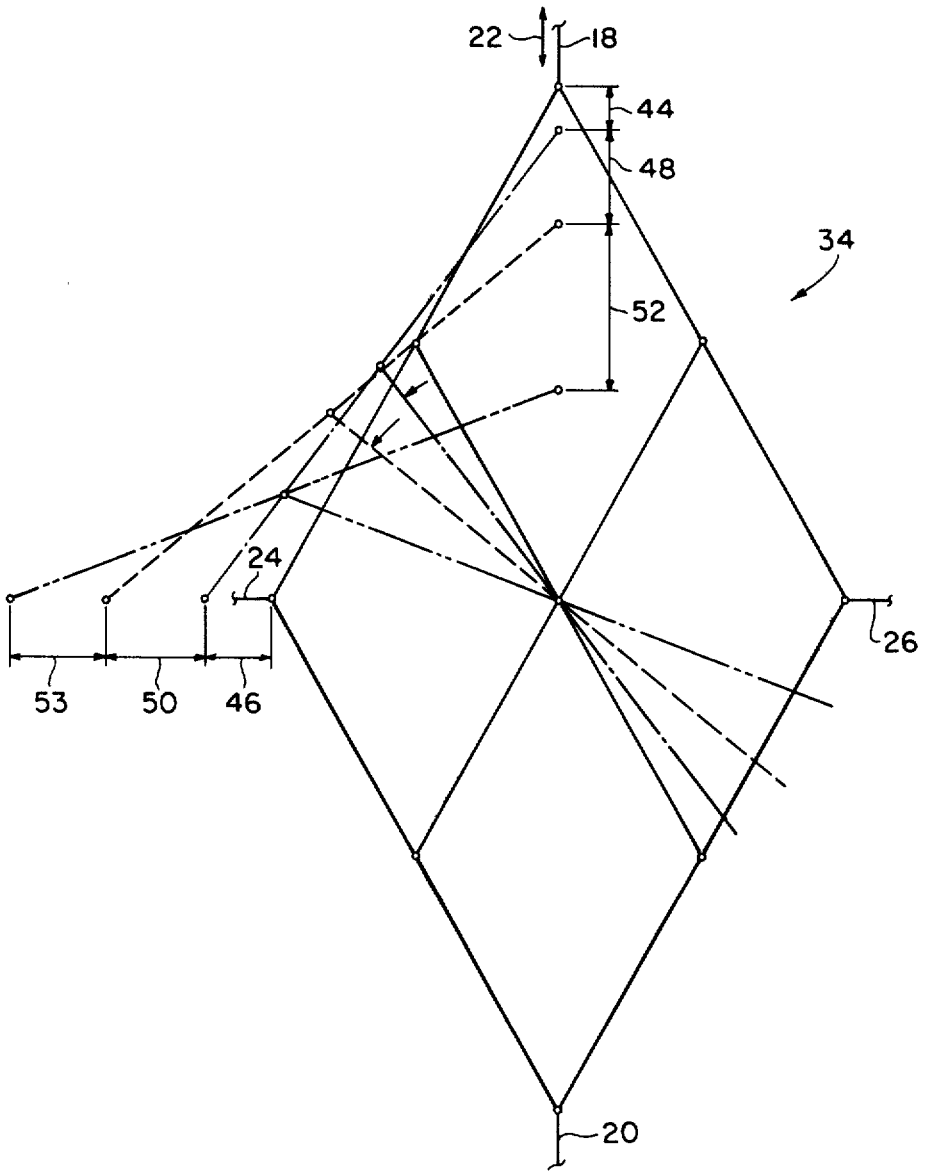

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a diagrammatic illustration, in plan view, of a device according to the present invention for converting the energy obtained from the combustion of fuel into potential energy in the form of pressure fluid; and FIG. 2 is a diagrammatic illustration showing the relationship between the power stroke provided by the combustion of said fuel and the corresponding stroke producing the powering pressure fluid.

Reference is now made to the drawings, and in particular to FIG. 1 in which there is shown the within improved device, generally designated 10, which may be accurately characterized as being an energy converter in that it is suited for converting fuel energy into potential energy for use in a prime mover, such as a motor powering a vehicle, a generator, or the like. To facilitate an understanding of the detailed description which follows, at this initial stage a general description is helpful. In this connection it should be noted that the device or converter 10 includes a cooperating pair of combustion cylinders 12 and 14 which are located on opposite sides of a housing 16, and thus in facing relation to each other. Each of the combustion cylinders 12, 14 has a piston operating therein, one end of each of which, designated 18 and 20, respectively, extends into the housing 16 and, in practice, is adapted to be urged in opposite directions towards and away from each other along a first movement path, designated 22.

Cooperating with the combustion piston rods 18 and 20 are piston rods 24 and 26, the same being oriented transversely of the movement path 22 and in crossing relation thereto. That is, during operation of the device 10, as soon will be described, the piston rods 24 and 26 move in opposite directions along a second movement path 28 which, as just noted, is perpendicular to that of the movement path 22. Piston rods 24 and 26 extend from cylinders 30 and 32.

In accordance with the present invention, there is located at the intersection of the movement paths 22 and 28, and thus in a central location within the housing 16, a force-transmitting linkage mechanism, generally designated 34. The operation of the device 10 is generally as follows. An appropriate fuel, in a mixture which supports combustion, is injected into the combustion cylinders 12 and 14 and the combustion thereof is initiated by a spark or the like which results in the fuel producing a rapidly expanding gas. The expansion of the gas of course results in the piston rods 18 and 20 being urged through movement towards each other along the first movement path 22. The function of the linkage mechanism 34 at this point in the operating cycle is one which transmits the movement in the piston rod ends 18 and 20 into corresponding movements in the piston rod ends 24 and 26, this latter movement being along the movement path 28 and in directions away from each other. This path of movement in turn results in the pistons operating within each of the cylinders 30 and 32 moving in that direction which causes compression of the fluid, such as oil, contained in these cylinders. This fluid, at its increased pressure, is thus forced out of each fluid-compressing cylinder 30, 32 into a cooperating storage device, which may be an oil accumulator, designated 36 and 38, which may be of any one of several available conventional constructions and has a well understood mode of operation. In road building and heavy construction equipment, for example, use is advantageously made of a so-called oil accumulator which, in practice, is supplied with high pressure oil that, upon demand, is released therefrom and effectively urges a ram or some other aspect of the equipment through its power stroke. One such oil accumulator which is available for use according to the present invention is that produced by Sperry Vickers, a division of Sperry Corporation of Lake Success, New York.

From the foregoing general description which, of course, will be subsequently supplemented with specific structural and operating details, it should be appreciated that the contemplated operation of the device 10 is to convert the energy released by the combustion of the fuel within the combustion cylinders 12 and 14 into potential energy, in the form of pressurized fluid produced in the fluid-compressing cylinders 30 and 32 and fed into the oil accumulators 36 and 38 for use upon demand. To this end, the oil accumulators 36 and 38 are adapted to be connected via conduits 40 and 42 to a fluid motor 43 of any conventional construction and mode of operation. The fluid motor, in turn, would be appropriately operatively connected to power a vehicle in movement, or a generator in rotation, all to the end of producing useful work.

The crux of the within invention resides in the distinctive manner, now to be described, in which the energy converter 10 converts the referred to combustion fuel energy produced within the combustion cylinders 12 and 14 into said potential energy in the specific form of the pressurized fluid exiting from the cylinders 30 and 32 into the accumulators 36 and 38. The efficiency of this conversion, in fact, is of such extent that despite the cost of such non-fossil fuels such as methanol, it is nevertheless feasible to use this fuel as a replacement for gasoline and other such fuels. Thus, the energy converter 10 hereof offers noteworthy advantages over a conventional gasoline engine from an ecological point of view.

To continue with what is believed to be the crux of the invention, the same as generally indicated is in the efficiency of the conversion of the energy of the combustion fuel into the potential energy of pressure fluid. This, in turn, is due to the unique manner in which the pressure build-up of the fluid within the accumulators 36 and 38 occurs. More particularly, the rapidly expanding gas which is produced by the combustion of the fuel in the combustion chambers 12 and 14 may be characterized, as is well understood, as consisting of an initial maximum value which, as the gas thereafter expands, progressively diminishes. If this same pressure pattern is duplicated in the oil accumulators 36 and 38 there would surely be significant efficiency losses in the form of dissipated heat. Thus, it is necessary that the pressure fluid initially start at a desirable low value and build up from this into a maximum pressure which, of course, is just the exact opposite of the pressure pattern of the expanding gas in the combustion cylinders 12 and 14. It is therefore one of the distinctive features of the present invention to provide a pressure pattern to the pressure fluid in the oil accumulators 36 and 38 which is the reverse of that in the combustion cylinders 12 and 14 which, as a result, greatly contributes to an efficient conversion from the input form of energy, i.e., an expanding gas-type fuel, into an output form of energy, i.e., the pressure fluid, such as pressure oil, as typically used in the operation of oil accumulators.

The manner in which the foregoing is achieved can be more readily appreciated by reference to FIG. 2 which is an isolated view of the force-transmitting linkage mechanism 34 in which exemplary different positions of movement are illustrated in full line, dot-dash line, and dash line perspectives. Since the piston rods 18 and 20 of the combustion cylinders 12 and 14, respectively, operate in an identical manner, the description of the piston rod 18 of cylinder 12 should suffice for purposes of understanding the within invention. Likewise, since the piston rods 24 and 26 of the fluid-compressing cylinders 30 and 32, respectively, operate in an identical manner, the description of what occurs to the rod end 24 during the operating cycle is also sufficient for present purposes. Specifically, due to the geometry of the linkage mechanism 34, the details of which will be subsequently described, an initial movement in the piston rod end 18 along the movement path 22 to an extent designated in FIG. 2 by the reference numeral 44 produces a corresponding movement in the piston rod 24 along the second movement path 28. Most important, such movement along path 28 is of a modified extent in relation to the distance 44. That is, this movement, designated 46, that initially is produced for the piston rod 24 is enlarged or amplified due to the geometry of the linkage mechanism 34. In this respect the function of the linkage mechanism 34 is somewhat similar to a pantograph linkage mechanism, wherein the input movement is modified, either by being magnified or diminished, at the output end. Since, in accordance with the laws of conversion of energy, the energy input must equal the energy output, since the input distance 44 is less than the output distance 46, it necessarily follows that the pressure exerted through these distances is of a reverse relationship. Thus, the pressure output at the piston rod end 28 at the start of the operating cycle is at a desirable lower value than the pressure input at the piston rod end 18. There is therefore no energy lost due to heat dissipation or the like.

During the next movement segment, as exemplified by distance 48 experienced by the piston rod 18, there is experienced by the piston rod 24 a movement traverse designated 50 which, it will be understood due to the geometry of the linkage mechanism 34, is almost equal to the distance 48. Thus, the pressures at input and output during this succeeding length segment are correspondingly equal.

Finally, the next movement segment 52 in the piston rod 18 produces a significantly diminished movement segment 54 in the output piston rod 28, again due to the geometry of the linkage mechanism 34. Thus, the pressure at the input is considerably less than the pressure at the output, which again is a pressure pattern that contributes to efficiency in the conversion of the input energy to the energy provided at the output. In summary, the pressure at the output end 24 is one which starts at a desirable optimum minimal value and steadily builds up to its maximum value.

QUADRANGLE COUPLER

The previously referred to linkage mechanism 34, which also can aptly be referred to as a quadrangle coupler, may be constructed in different sizes while still providing the advantageous pressure pattern as just described in connection with FIG. 2. The proportion, however, of a preferred embodiment is one in which its four outside links, more particularly designated 54, 56, 58 and 60, are equal in size. As clearly illustrated, these links are pivotally interconnected to each other at their ends, as at the locations individually and collectively designated 62, to thereby bound an internal diamond shape. At a medial location of each of these links, as at the location 64, these links are pivotally connected to a pair of criss-crossing links 66 and 68 which, in turn, are pivotally interconnected to each other at a central intersection 70. As shown in FIG. 1, the just desribed linkage mechanism or quadrangle coupler 34 at each of the locations 62 is respectively connected to the extending ends of the piston rods 18 and 20 of the compression cylinders 12 and 14, respectively, and to the piston rod ends 24 and 26 of the cylinders 30 and 32, respectively. Accordingly, in practice, when the piston rods 18 and 20 are urged towards each other along the first movement path 22 in response to the expanding gas produced by the combusting fuel, as already explained, the diamond shape of the linkage 34 which has its long dimension oriented along the movement path 22 is of course modified. More particularly, this modification manifests itself in movement of the piston rods 24 and 26 away from each other along the second movement path 28, such that the modified diamond shape of the linkage 34 is one in which the long dimension then becomes oriented along the movement path 28. Stated another way, the long and short dimensions of the diamond shape of the linkage mechanism 34 is reversed as a result of the movement of the piston rods 18 and 20 through their respective power strokes along the first movement path 22 and the movement of the piston rods 24 and 26 through their respective fluid-compressing strokes along the second movement path 28, the same occurring according to the favorable pressure pattern already described and explained in connection with FIG. 2.

PREFERRED CONSTRUCTION OF THE WITHIN ENERGY CONVERTER OR DEVICE

From the description already provided, it should be readily understood from well understood and available technology how to construct the device 10 so as to utilize an expanding gas-type fuel and efficiently convert the energy thereof into potential energy in the specific form of pressurized fluid. However, for completeness sake, in the description which follows there will be provided a description of a preferred construction of such a device, as well as a description of a typical operating cycle thereof. For simplicity and brevity sake, however, since it has already been noted that the two combustion cylinders 12 ad 14 are essentially similar to each other, the description which follows will be limited to that of combustion cylinder 12. Likewise, since the cylinders 30 and 32 are also similar, the description which follows will be limited to that of the cylinder 30.

Combustion cylinder 12, in its preferred form as illustrated diagrammatically in FIG. 1, includes two cylindrical walls 72 and 74 which respectively bound an upper main combustion chamber 76 and a lower auxiliary air compression chamber 78. Appropriately connected to the walls 72 and 74 and thus functioning as closures for the chambers 76 and 78 is an upper member or header 80, a bottom member 82, and an intermediate chamber-dividing member 84. Also appropriately mounted in surrounding relation about the cylindrical walls 72 and 74 is an outer cylindrical upper and lower casing 86 and 88, respectively, which each bound annular air passages 90 and 92 which communicate with each other via a one-way check valve 94. Piston rod 18 includes two pistons 96 and 98 which respectively operate within the main combustion and air compression chambers 76 and 78.

Assuming that the pressure fluid within the previously referred to oil accumulator 36 is below the level required for it to serve as a suitable and adequate power source, said fluid being designated 100 in FIG. 1, this condition is signaled by an appropriate control mechanism (not shown) to a fuel-ignition system for the combustion cylinder 12, which system is diagrammatically represented by fuel pump 102, ignition switch 104, fuel injector 106, and a conventionally constructed and operated spark generator 108. In response to said signal, appropriate fuel, such as methanol, is delivered by the fuel pump 102 through the fuel rate control mechanism 106, and through appropriate passages into the main combustion chamber 76 at a point of delivery which is above the piston 96. Simultaneously therewith, compressed air for mixture with the fuel is delivered through a control valve 110 also into said main combustion chamber 76, the compressed air being at an appropriate pressure and also in a pre-heated condition which contributes to efficiency in the contemplated combustion of the fuel mixture. As is well understood, combustion of this fuel mixture is initiated by the spark discharge of the spark generator 108 and produces a rapidly expanding gas of an initial maximum pressure which, acting against the piston 96, urges the piston rod 18 through a power stroke movement along the first movement path 22. The consequence of said power stroke has already been described in connection with FIG. 2. In addition, there is of course simultaneous movement of the lower piston 98 through the air compression chamber 78 which compresses air in the coupler side of chamber 78, transferring air through valve 154, during the last one-quarter of the forward stroke of piston 98, to the opposite, or remote, side of chamber 78 for further compression of said transferred air on the return stroke. This directional movement of piston 98 is effective in producing a vacuum or other favorable pressure gradient which opens valve 112 and causes the flow of air into chamber 78 above the piston 98 for subsequent compression and use as part of the fuel mixture for the compression cylinder 12. Compression of the air entering the chamber 78 occurs during the return movement of piston 98 to its starting or full line position as illustrated in FIG. 1, during which the air when attaining a desired pressure is forced through the exit passage 114 onto the annular passage 90 in which the pressure air, when reaching a still higher selected level of pressure, forces its way past the valve 94 into the upper annular passage 92. From passage 92, the pressure air is channeled through appropriate air passages, as exemplified by conduit 116, which brings it in communication with the fuel annulus 118 in which it mixes with the injected fuel and forms the fuel mixture for the combustion cylinder 12, but not until pilot valve 148 is opened momentary from an appropriate control mechanism or transducer at the accumulators 36, 38. Thus, the pressure air reaches its desired pressure in the annular chamber 90 and also achieves a desirable elevated temperature as a result of heat transfer to it from the products of combustion and the combustion process occurring in the main chamber 76.

Reference is now made to a preferred construction of the cylinder 30. This cylinder, like the combustion cylinder 12, also has two chambers, namely a main fluid or oil-compressing chamber 120 and an auxiliary chamber 122. These chambers are formed by cylindrical walls 124 and 126, and have a header or closure member 128 at one end, a member 130 at the other end, and an intermediate divider member 132. Affixed to the piston rod 24 and operating within the chambers 120 and 122 are pistons 134 and 136. Operatively associated with the header or closure member 128 is an exit valve mechanism 138 which supervises the exiting flow of pressure fluid from the main fluid-compressing chamber 120 into the oil accumulator 36. In this connection, the pressure of this exiting fluid is exerted against an air-filled air bag 140 which changes its volume in an appropriate manner to accommodate the influx of pressure fluid. Naturally, the air compressed within the air bag 140 exerts a reaction force against the pressure fluid 100 to supply the same under pressure, and thus with potential energy, when this fluid is permitted to exit through the previously referred to conduit 40 which connects with an appropriate fluid motor which, in turn, is operatively arranged to produce useful work.

In the contemplated operation of the device 10 and, more particularly, the cylinder 30 thereof, it should be readily appreciated that in response to the power stroke of the piston rods of the compression cylinders 12, 14 that this movement as transmitted through the linkage mechanism 34 results in the piston rods 24 and 26 being urged through their fluid-compressing stroke. Thus, taking piston rod 24 as an example, the movement thereof along the second movement path 28 results, of course, in movement of the pistons 136 and 134 from their full line positions illustrated through the volumes bounded by the chambers 122 and 120. Movement of piston 134 through chamber 120 results in compression of the pressure fluid 100 and thus its entry into the oil accumulator 36. Movement of piston 136 advances the same to a favorable position adjacent the divider member 132, thus exhausting chamber 122 through the open pilot valve 158. This is significant since at an appropriate advantageous time during the combustion process occurring in the main combustion chamber 76, namely that corresponding with the end of the power stroke, the residual pressurized products of combustion are permitted to exit through valve mechanism 110 and through the conduit 142 for entry through the valve passage in the divider 132 so as to achieve pushing contact against the piston 136. In this manner, the residual products of combustion are effective in urging piston 136 from a position of movement adjacent the divider 132 back to its original starting position adjacent the end member 130. In urging the piston 136 through the just described return stroke, this of course also returns the fluid-compressing piston 134 to its original starting position. Moreover, movement of the piston rods 24, 26 towards each other along the second movement path 28 urges, via the linkage mechanism 34, corresponding movement in the piston rods 18 and 20 which, of course, returns the pistons 96, 98 to their original starting positions within the two chambers 76 and 78 of the combustion cylinders 12, 14. To signal the end of a power stroke and the need to initiate the return stroke, and vice versa, use is made of cooperating contact switches and contact arms 150, 152, respectively, which, in turn, are operated by the changing shape of the coupler 34.

From the foregoing it should be readily appreciated that it is possible, and advisable, to apply to the device 10 various techniques to supplement and contribute to the efficiency of the basic concept of the device 10. Exemplary of these additional techniques are the preheating and pressurizing of the air utilized in the fuel mixture, and the use of the residual products of combustion to return the pistons in the cylinders 12, 14 and 30 and 32 to their original starting positions, all as has been described in connection with the preferred embodiment diagrammatically illustrated in FIG. 1. These additional techniques obviously increase the efficiency of the device 10, but also obviously are not as significant in contributing to the efficiency thereof to the same extent as does the use of the quadrangle coupler 34 and the distinctive pressure pattern which it provides during the conversion of the energy expended in the combustion cylinders 12, 14 to the potential energy in the form of pressure fluid created during the operation of the fluid-compressing cylinders 30, 32. The use of the quadrangle coupler or linkage mechanism 34 in the environment herein described is thus essential to the present invention, whereas other described structural attributes are preferred, but may be dispensed with or modified. In this connection, a latitude of modifications, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. An improved fuel-operated device comprising a pair of combustion cylinders having pistons therein each having slidably disposed piston rods extending therefrom operatively arranged in opposing facing relation to each other such that said piston rods are urged through power strokes towards each other along a first movement path, means for admitting a gas-producing type fuel for said combustion cylinders effective to cause an initially maximum pressure expanding gas in said cylinders for powering said piston rods through said power strokes, a pair of pressure transfer fluid cylinders having pistons therein each having slidably disposed piston rods extending therefrom operatively arranged in opposing facing relation to each other such that said *transfer cylinder* piston rods are urged through fluid pressure strokes away from each other along a second movement path oriented perpendicularly and in crossing relation to said first movement path, passage means connected from said pressure transfer fluid cylinders to a storage means for flowing said pressure transfer fluid thereto, an outlet connection from said storage means to a pressure fluid-operated motor for allowing said pressure transfer fluid to power said motor in operation in the performance of work utilizing said pressure transfer fluid energy, and a coupling linkage means strategically located at the intersection of said first and second movement paths operatively interconnected between said piston rods of said combustion and said pressure transfer fluid cylinders so as to produce said fluid pressure strokes in the latter in response to said power strokes of the former, said coupling linkage means [including pivotally interconnected links in a diamond-shaped configuration] *comprising a first criss-crossing pair of links pivotally interconnected to each other at an intersection therebetween and a second cooperating group of an additional four links bounding a diamond-shaped configuration and in the interior thereof having the free ends of said criss-crossing pair of links respectively pivotally connected to a medial location to each said link of said additional group of four links such that the links defining the four ends of said diamond shape are adapted to be urged through movement in opposite directions along first and second movement paths and wherein the interconnection of said links in said diamond-shaped configuration is* effective to initially cause an amplification of said movement occurring along said first movement path in said corresponding extent of movement occurring along said second movement path and subsequently a reversal therein, whereby despite an initial maximum pressure in said expanding gas of said fuel there is produced in said fluid a pressure at a desirable starting minimum value which subsequently builds up therein to thereby contribute to the efficiency of the conversion of said fuel energy into usable pressure fluid energy.

2. An improved fuel-operated device as claimed in claim 1 including motor cylinders having pistons therein connected to said pressure transfer cylinder piston rods, passage means interconnecting said combustion and motor cylinders to each other effective to channel the discharging gas produced from said fuel in said combustion cylinders to said motor cylinders so as to urge said piston rods of said pressure transfer fluid cylinders back to their starting positions thereof, whereby said piston rods of said combustion cylinders are correspondingly urged to return to starting positions thereof by said coupling linkage means interconnecting said pistons rods.

3. An improved fuel-operated device as claimed in claim 2 including an air heat exchange chamber in surrounding relation to each combustion cylinder for heat exchange between said gas produced by said fuel and air, and means for channeling said pre-heated air into said combustion cylinder upon demand incident to the operation of said combustion cylinders.

4. An improved fuel-operated device comprising a pair of combustion cylinders having pistons therein each having slidably disposed piston rods extending therefrom operatively arranged in opposing facing relation to each other such that said piston rods are urged through power strokes toward each other along a first movement path, means for admitting a gas-producing type fuel for said combustion cylinders effective to cause an initially maximum pressure expanding gas in said combustion cylinders for powering said piston rods through said power strokes, a pair of pressure transfer fluid cylinders having pistons therein each having slidably disposed piston rods extending therefrom operatively arranged in opposing facing relation to each other such that said *transfer cylinder* piston rods are urged through fluid pressure strokes away from each other along a second movement path oriented perpendicularly and in crossing relation to said first movement path, an operative arrangement of pivotally interconnected links in a diamond-shaped configuration operatively interconnected between said piston rods of said combustion and said pressure transfer fluid cylinders so as to produce said fluid pressure strokes in the latter in response to said power strokes of the former, a criss-crossing pair of links pivotally interconnected to each other at an intersection therebetween, a cooperating group of an additional four links bounding said diamond-shaped configuration and in the interior thereof having the free ends of said criss-crossing pair of links respectively pivotally connected to a medial location to each said link of said additional group of four links such that the links defining the four ends of said diamond shape are adapted to be urged through movement in opposite directions along said first and second movement paths to produce corresponding movements in said piston rods of said combustion and pressure transfer fluid cylinders, passage means connected from said pressure transfer fluid cylinders to a storage means for said pressure fluid, and an outlet connection from said storage means to a pressure fluid-operated motor, whereby said pressure fluid is adapted to power said motor in operation in the performance of work utilizing said pressure fluid energy.

5. An improved fuel-operated device as claimed in claim 4 including motor cylinders having pistons therein connected to said pressure transfer cylinder piston rods, passage means interconnecting said combustion and motor cylinders to each other effective to channel the discharging gas produced from said fuel in said combustion cylinders to said motor cylinders so as to urge said piston rods of said pressure transfer fluid cylinders back to their starting positions thereof, whereby said piston rods of said combustion cylinders are correspondingly urged to return to said starting positions thereof by said coupling linkage means interconnecting said piston rods.

6. An improved fuel-operated device as claimed in claim 5 including an air heat exchange chamber in surrounding relation to each combustion cylinder for heat exchange between said gas produced by said fuel and air, and means for channeling said pre-heated air into said combustion cylinder upon demand incident to the operation of said combustion cylinders.

* * * * *